United States Patent
Way et al.

[11] 3,789,521
[45] Feb. 5, 1974

[54] FIBER OPTIC TEACHING AID DISPLAY

[76] Inventors: Frederick L. Way; Donald F. Way, both of Signal Hill Rd., Brookfield, Conn. 06804

[22] Filed: Oct. 20, 1972

[21] Appl. No.: 299,440

[52] U.S. Cl. .................... 35/43, 35/8 R, 40/130 R, 340/380
[51] Int. Cl. .......................................... G09b 27/04
[58] Field of Search ...... 35/8 R, 9 R, 9 A, 9 B, 9 C, 35/21, 40, 43, 44; 340/225, 380; 40/130 R, 130 K

[56] References Cited
UNITED STATES PATENTS

| | | | |
|---|---|---|---|
| 3,470,629 | 10/1969 | Kittredge et al. | 35/44 |
| 1,132,108 | 3/1915 | Merk-Wirz | 340/225 |
| 3,277,588 | 10/1966 | Lynott et al. | 35/9 A |

*Primary Examiner*—Wm. H. Grieb
*Attorney, Agent, or Firm*—Brumbaugh, Graves, Donohue & Raymond

[57] ABSTRACT

A teaching aid comprises a display surface having a plurality of lighting element locations arranged in predetermined patterns. The ends of a plurality of light-conducting fibers are received in and extend from the lighting element locations on the display surface. The other ends of the light-conducting fibers are received in a support surface which retains the ends in predetermined groupings corresponding to selected patterns on the display surface. A movable pen light is provided for selectively illuminating the various groupings of fiber ends on the support surface, the fibers transmitting the light to illuminate the corresponding patterns on the display surface.

6 Claims, 4 Drawing Figures

Patented Feb. 5, 1974

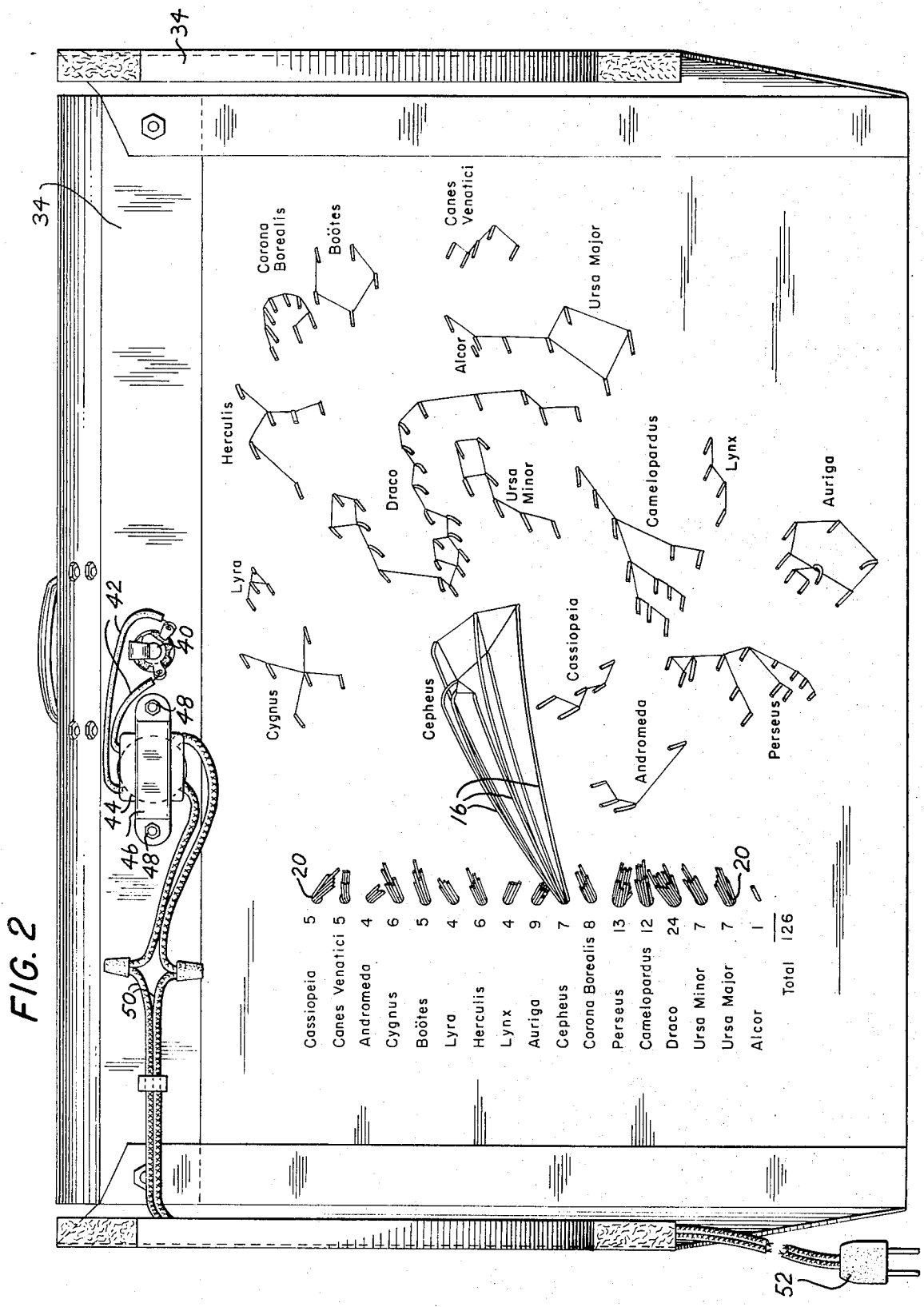

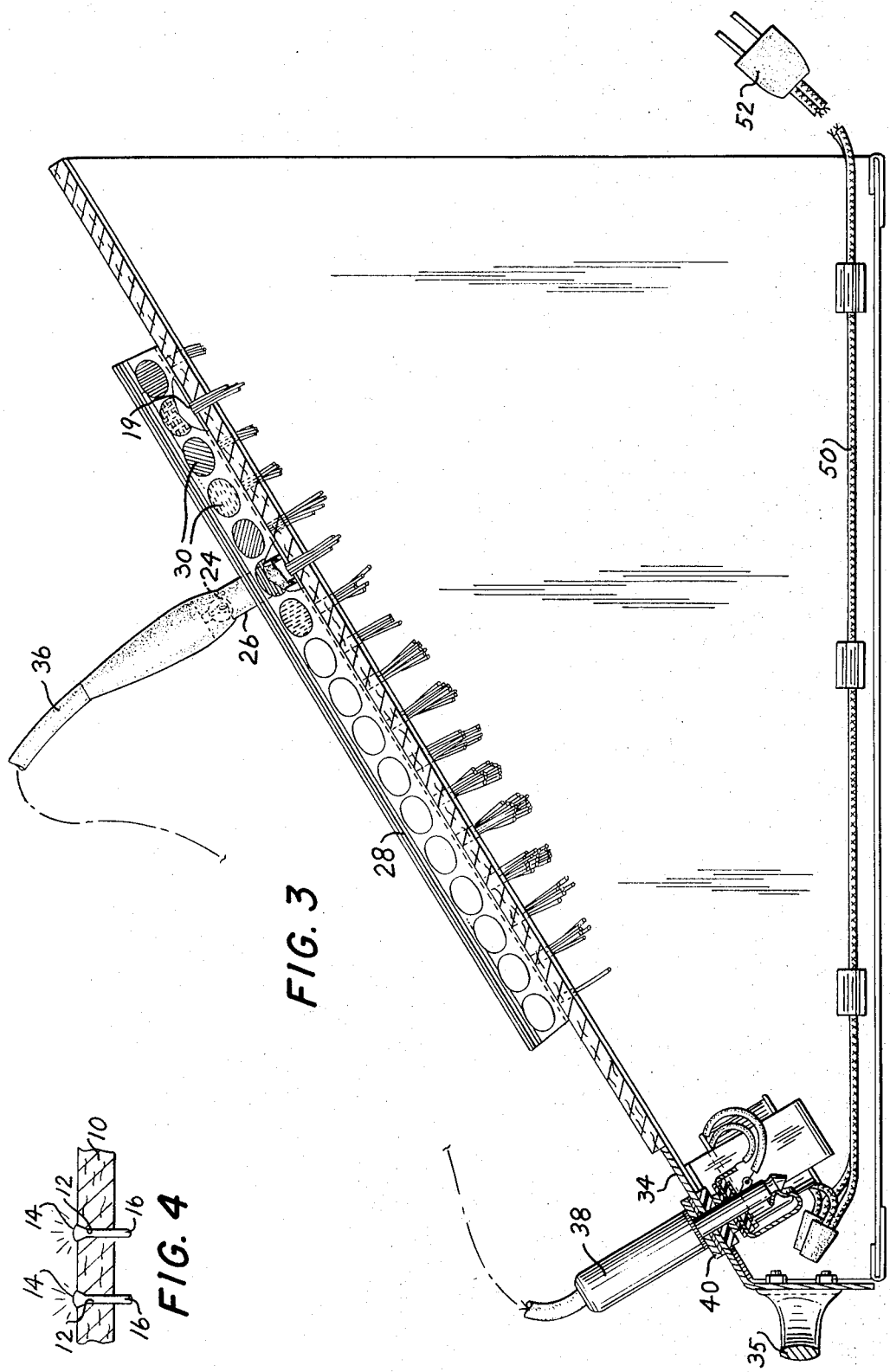

3,789,521

FIBER OPTIC TEACHING AID DISPLAY

BACKGROUND OF THE INVENTION

The benefits of providing visible, demonstrative examples for students, especially younger children, has led to the proliferation of sophisticated audiovisual aids. While audiovisual aids such as motion picture and slide projectors are useful and provide fresh avenues of approach in teaching, they are relatively expensive and have numerous moving parts that are subject to wear and susceptible to damage from careless handling. In small classes, the per pupil cost of a projector can be excessive. Motion picture and slide projectors are also intended to be operated by an individual or to run automatically, while the students view and listen to the material being presented. The projectors are effective in presenting material in an interesting manner to a large group, but they deny the students a degree of participation in the classroom activity, making them passive spectators and dampening their interest. Furthermore, it is necessary to darken at least the portion of the room surrounding the projection screen for optimal picture clarity and contrast. The darkened room distracts the students, and the least interested students may even sleep.

SUMMARY OF THE INVENTION

The present invention is a novel teaching aid which is relatively inexpensive to manufacture and which may effectively be used by individual students. The teaching aid comprises a display surface having a plurality of lighting element locations, each arranged in a predetermined pattern, for example, an arrangement simulating the constellations in the Northern Hemisphere. The lighting element locations receive the ends of a plurality of light-conducting fibers. The other ends of the fibers are received in a support surface that retains the fiber ends in predetermined groupings corresponding to desired patterns on the display surface. For example, the ends of the fibers extending from the lighting element locations that represent a particular constellation would be grouped together. A pen light is utilized to illuminate any group of fiber ends in the support surface, the fibers transmitting the light to the fiber ends retained in the display surface. To accentuate the various patterns, such as constellations, on the display surface, the teaching aid comprises a colored filter strip that may be selectively placed between the lamp and the groupings of fiber ends in the support surface.

The display surface and the support surface are located generally in the same plane and oriented such that the operator of the teaching aid may view the two surfaces simultaneously. It is, of course, possible to make the teaching aid and its display surface as large or small as desired. Thus, in a classroom, the display surface might take up a portion of a wall and be a permanent fixture, while a smaller, portable embodiment of the teaching aid might be used in the home or for teaching individual students.

The present invention, while not replacing a motion picture or slide projector, nonetheless provides an inexpensive and convenient alternative in many situations. It is easy to operate and has few parts that are subject to operating wear and tear or to damage from careless handling. It also has other applications, such as in educational toys.

BRIEF DESCRIPTION OF THE DRAWINGS

For a better understanding of the invention, reference may be made to the following description of an exemplary embodiment, taken in conjunction with the figures of the accompanying drawings, in which:

FIG 2 is an inverted rear view of the embodiment of FIG. 1;

FIG. 3 is a sectional view of the embodiment of FIG. 1 taken along view line 3—3; and FIG. 4 is a sectional view of the display surface of the embodiment, showing the fiber ends retained in the display surface, taken along view line 4—4 of FIG. 1.

DESCRIPTION OF THE INVENTION

Figure 1:
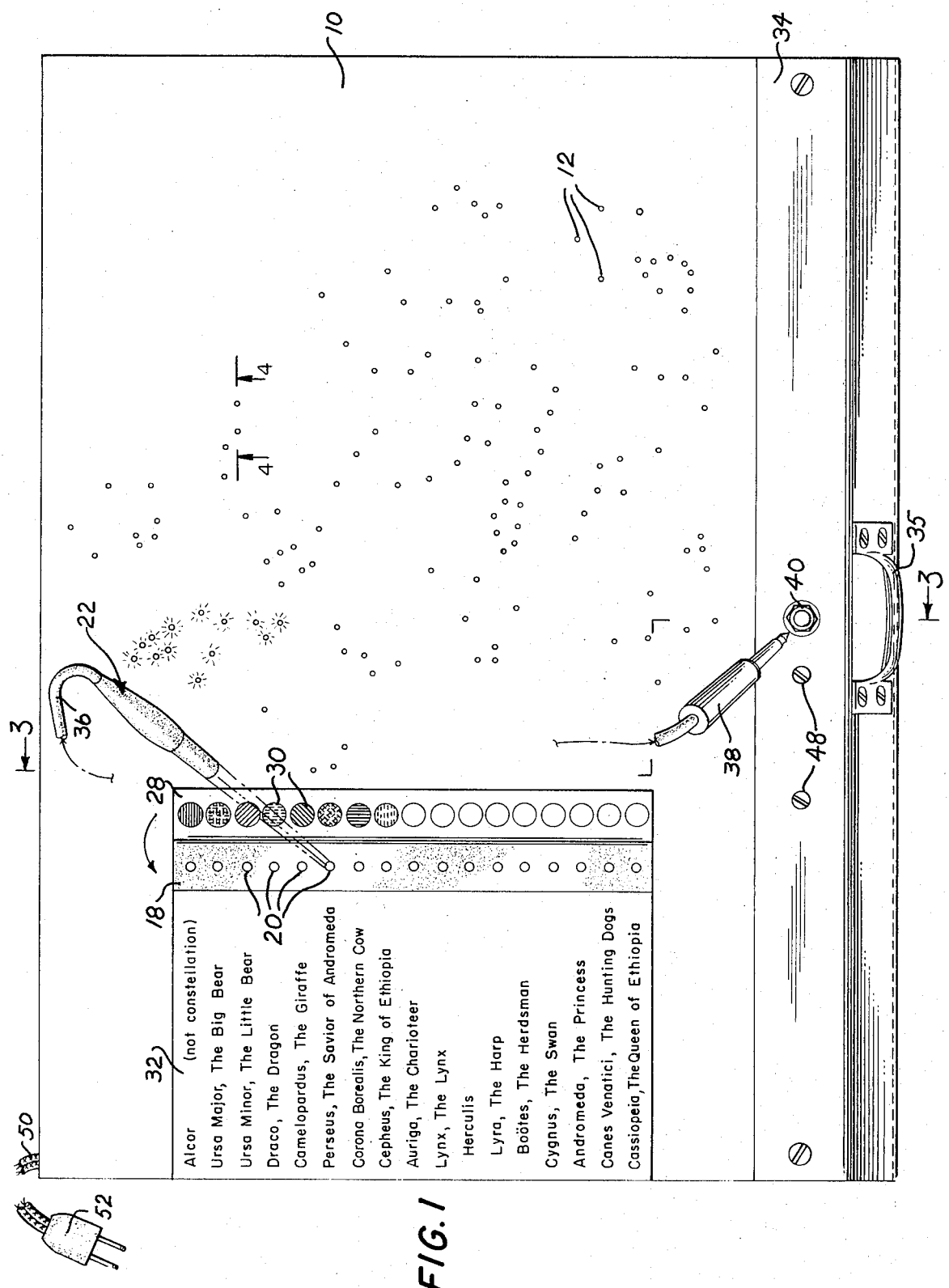
FIG. 1 is a front view of a typical portable teaching aid according to the invention, having a display surface patterned to represent the constellations of the Northern Hemisphere.

In an exemplary embodiment of the invention, as shown in FIGS. 1–4, a teaching aid comprises a display surface 10 having a plurality of holes 12, arranged in a predetermined pattern, to receive lighting elements. The lighting element holes 12 of the exemplary embodiment are arranged to simulate the constellations of the Northern Hemisphere. The display surface 10 is flat and is made of any sturdy, lightweight material, such as the materials designated by the trademarks "Styrobord" and "Masonite," in which the holes 12 may be conveniently drilled.

As shown in FIG. 4, the "star" ends 14 of a plurality of star identifying light-conducting fibers 16 are received in the lighting element holes 12 on the display surface 10. The fibers 16 have an inner core of light-conducting material and an outer covering of a second material that has a lower refractive index than the inner core. Thus, light waves received at one end of a fiber 16 are confined in the core by the outer covering and are transmitted throughout the length of the fiber 16. The star ends 14 of the fibers 16 are enlarged, resembling an inverted cone, so that they extend beyond the plane of the surface 10 and also provide a larger illuminated area at each lighting element location.

The light-conducting fibers 16 extend from the display surface 10 to a support surface 18 that receives the other ends 19 of the fibers 16 and retains the ends 19 in predetermined groupings 20, corresponding to desired patterns on the display surface 10. The ends 19 of the fibers 16 are not enlarged like the star ends 14 retained in the display surface 10. FIG. 2 illustrates how the fibers 16 for a particular pattern, in this case the constellation Cepheus, are brought together from the various lighting element holes 12 that represent the individual stars of the constellation into a labeled grouping 20 in the support surface 18.

A hand-held pen light 22 for selectively illuminating the groupings 20 of fiber ends 19 in the support surface 18 includes a bulb 24 secured in a socket at one end of an elongated shade 26, as shown in FIG. 3. The shade 26 confines the light rays from the bulb 24 and concentrates the rays on a single grouping 20. In FIG. 1, the grouping 20 labeled "Perseus" has been selected and the corresponding pattern of star ends 14 in the display surface 10 representing the constellation has been illuminated.

To increase the distinctions between the various patterns on the display surface 10, the star ends 14 in the display surface may be illuminated with colored light. A hinged filter strip 28, located adjacent the fiber ends 19 in the support surface 18, carries a plurality of different color filters 30, each dimensioned to completely cover a grouping 20 of fiber ends 19. The panel 28 may be pivoted until it lies over the fiber ends 19, providing a different color filter 30 to filter the light passing to the ends of the fibers 16 in each grouping 20.

Although the groupings 20 of fiber ends 19 may be located anywhere that is convenient for operating the teaching aid, the support surface 18 of the illustrated embodiment is located generally in the same plane as the display surface 10 and is contiguous therewith. The co-planar arrangement of the support surface 18 and the display surface 10 permits the teaching aid to be used by an individual student. It is within the scope of the invention, however, to have the label 32 that identifies the groupings 30 and the support surface 18 at a separate location, hidden from the view of one looking at the display surface 10. Thus, an instructor might conveniently sit or stand in front of a panel carrying the support surface 18, while the display surface 10 is located some distance from him, to direct the attention of the students at the display surface 10 rather than at the instructor.

The illustrated embodiment of the invention is further provided with a frame 34 to which the display surface 10, the support surface 18, and the pen light 22 are coupled for convenience in handling and transporting the teaching aid. The frame 34 may be fabricated of any strong, lightweight material, such as, aluminum. As shown in FIG. 3, the frame is generally triangular in cross section. A handle 35 is bolted to one side of the frame to permit the teaching aid to be carried like a suitcase.

The pen light 22 is joined to the frame 34 by a means of an insulated wire 36 and a single-pronged plug 38. The plug 38 is adapted to be inserted into a jack 40 mounted in the frame 34 adjacent the lower edge of the surface 10. The jack 40 is, in turn, connected by conductors 42 to a transformer 44 that is secured to the underside of the frame 34 by a U-shaped bracket 46 and bolts 48. Insulated conductors 50, which run along the bottom side of the frame 34 to the rear of the teaching aid, couple the transformer 44 to plug 52 that is adapted to be connected to an ordinary household socket. The light 22 may, of course, be battery operated and may be separate from the frame 34.

In operation, the operator inserts the plug 38 of the pen light 22 into the socket 40 of the teaching aid to energize the pen light. To demonstrate which stars form the constellations in the Northern Hemisphere, the light 22 is held over each of the groupings 20. The stars in each constellation may be illuminated in different colors by laying the filter strip 30 over the groupings 20. To test one's knowledge of the stars, the light from the pen light 22 may be shone onto the star end 14 of any one of the fibers. The fiber will transmit the light back to the grouping 20 with which the fiber is associated to identify the constellation in which the star is located.

As can be seen from the above description, the invention provides an inexpensive, easy-to-operate, and interesting teaching aid. The teaching aid may be used by the individual, thereby allowing him to participate more fully in the learning process. It can be operated by children without much possibility of damaging the components and the cost of replacing such components as might be damaged or wear out is small.

It will be understood that the above-described embodiment is merely exemplary and that those skilled in the art may make many variations and modifications without departing from the spirit and scope of the invention. All such modifications and variations are intended to be within the scope of the invention as defined in the appended claims. We claim:

1. A teaching aid comprising display means having a plurality of lighting element locations arranged in predetermined patterns, a plurality of light-conducting fibers, each having one end received in and extending from one of the lighting element locations on the display means, support means receiving the other ends of the light-conducting fibers and retaining them in predetermined groupings corresponding to desired patterns on the display means, and movable light source means for illuminating selected ones of the predetermined groupings of light-conducting fibers, the fibers transmitting the light to illuminate the corresponding patterns on the display means, the movable light source means including at least one movable light adapted selectively to illuminate at least two of said selected ones of the predetermined groupings of light-conducting fibers.

2. A teaching aid according to claim 1, wherein the display means comprises a display surface for receiving the one ends of the light-conducting fibers and the support means comprises a support surface for receiving and retaining the other ends of the light-conducting fibers, the display surface and the support surface being located generally in the same plane and in contiguous relationship.

3. A teaching aid according to claim 1, further comprising filter strip means carrying a plurality of different color filters removably located above the predetermined groupings to filter the light passing between the light source and the groupings of light-conducting fibers.

4. A teaching aid according to claim 1, further comprising means located adjacent the groupings of light-conducting fibers for identifying the patterns of lighting element locations associated with each grouping of fibers.

5. A teaching aid according to claim 1, wherein the fibers identify stars and wherein the predetermined patterns correspond to constellations of stars.

6. A teaching aid comprising display means having a plurality of lighting element locations arranged in predetermined patterns, a plurality of light-conducting fibers, each having one end received in and extending from one of the lighting element locations on the display means, support means receiving the other ends of the light-conducting fibers and retaining them in predetermined groupings corresponding to desired patterns on the display means, movable light source means for illuminating selected ones of the predetermined groupings of light-conducting fibers, the fibers transmitting the light to illuminate the corresponding patterns on the display means, and jack means adapted to receive energization current, the light source means including a pen light with conductors terminated by a plug for insertion into the jack means.

* * * * *